United States Patent [19]

Elsing et al.

[11] 4,405,136
[45] Sep. 20, 1983

[54] PNEUMATIC CARTRIDGE SEAL FOR COMPUTER DISC DRIVE CARTRIDGE

[75] Inventors: John W. Elsing, Minneapolis; Steven D. Knopp, Bloomington, both of Minn.

[73] Assignee: Magnetic Peripherals Inc., Minneapolis, Minn.

[21] Appl. No.: 453,401

[22] Filed: Dec. 27, 1982

[51] Int. Cl.³ .................... G11B 17/02; F16J 15/46
[52] U.S. Cl. ............................ 277/12; 277/27; 277/152; 360/97; 206/444
[58] Field of Search .................... 360/97, 98, 135; 206/444; 277/3, 27, 12, 32, 71, 72 R, 79, 152

[56] References Cited

U.S. PATENT DOCUMENTS

| 4,185,308 | 1/1980 | Fujioka | 360/97 |
| 4,222,575 | 9/1980 | Sekiguchi et al. | 277/152 X |
| 4,249,221 | 2/1981 | Cox et al. | 360/97 |

FOREIGN PATENT DOCUMENTS 1442532  5/1966  France .................. 277/152
2040538A 8/1980  United Kingdom ........ 360/97

OTHER PUBLICATIONS

IBM Technical Disclosure Bulletin, vol. 22, No. 6 (Nov. 1979) 2 pp.; "Disk Release Mechanism for Magnetic Disk Cartridge."

Primary Examiner—Robert S. Ward, Jr.
Attorney, Agent, or Firm—J. A. Genovese; E. P. Heller, III

[57] ABSTRACT

A pressurized seal which comprises the interface between a disk drive spindle housing and a disk cartridge housing whereby dirty, unfiltered air is prevented from entering the disk area of the cartridge when mounted on the disk drive. The seal is comprised of an annular stop having three channels. An inner channel has mounted therein a circular cross-sectioned, flexible tube running the length of the channel. A intermediate channel connects to a source of pressurized filtered air. An outer ring mounts a flap seal which is forced against the cartridge housing by the pressurized filtered air.

4 Claims, 2 Drawing Figures

PNEUMATIC CARTRIDGE SEAL FOR COMPUTER DISC DRIVE CARTRIDGE

BACKGROUND OF THE INVENTION

1. Field of the Invention

The invention relates generally to the field of disk drives and more particularly to cartridge disk drives.

2. Brief Description of the Prior Art

When cartridge disk drive cartridges are mounted on the spindle of the disk drive the cartridge housing which normally connects to the hub upon which the individual disks are mounted must be separated from the hub to allow free rotation of the hub on the spindle. In this regard disk drive designs have included stops mounted on the spindle housing which abut against the bottom of the cartridge housing forcing it up a small distance to create a running clearance between the cartridge housing and a flange mounted on the disk hub.

During operation of the disk drive, the spinning of the hub and disk creates a centrifugal pumping action which creates a partial vacuum in the area of the hub, this in turn causes air to be drawn in between the cartridge housing and hub flange through the running clearance space. Unless the abutment between the spindle housing stops and the bottom of the cartridge is airtight, dirty, unfiltered outside air is drawn into the vicinity of the hub through this running clearance and can degrade the performance of the disk drive over time.

SUMMARY OF THE INVENTION

In recognition of this problem the present invention comprises a pressurized pneumatic seal at the abutting interface between a spindle housing stop and the disk drive cartridge. The stop seal is comprised of an annular ring having three channels. The inner channel houses a flexible, continuous tube which abuts against the bottom of the cartridge housing forming an air-tight seal between the cartridge housing and the spindle housing. A intermediate channel is connected to a source of pressurized filtered air. An outer channel houses an annular flap seal. The pressurized air forces the flap against the bottom of the cartridge housing.

In this manner, if there are any imperfections in the seals or in the cartridge surface, the air entering the cartridge during operation will come from the source of pressurized filtered air rather than from an outside source.

DESCRIPTION OF THE PREFERRED EMBODIMENT

Figure 1:
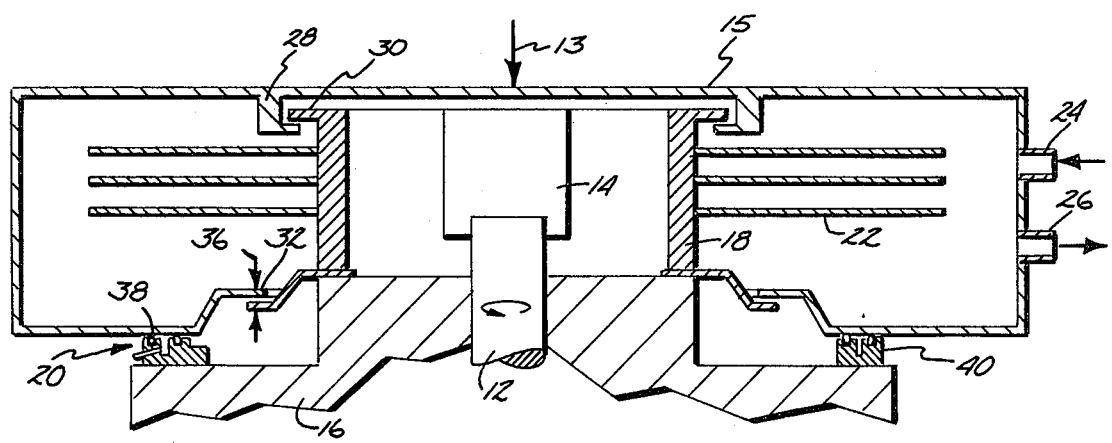
FIG. 1 shows a cross-sectional view of the stop seal of the present invention abutting between a disk drive's spindle housing and a disk cartridge's housing.

FIG. 1 shows a disk cartridge 10 mounted on a disk drive's spindle 12. Details unnecessary to the invention have not been shown for the purposes of clarity.

The cartridge 10 mounts on spindle 12 via mounting means 14 to allow the hub 18 and disk 22 combination to rotate with the spindle 12. For rotation to take place, cartridge housing 15 must be disconnected from hub 18. (When not mounted on the disk drive, the cartridge housing presses against the hub locking it in place. This prevents damaging movement of the hub and disks as well as seals the interior of the cartridge from contamination by dirty outside air.) In this regard, a means (not shown) will generally apply a force indicated by arrow 13 directed downwards on top of the cavity to space the top of the cartridge housing 15 down a short distance such that a flange 28 mounted on the cartridge housing 15 separates a short distance from a flange 30 mounted on hub 18. Likewise the cartridge housing abuts against a stop 20, 40 (members 20, 40 are lateral cross-sections of a continuous annular ring) mounted on spindle housing 16 such that a cartridge housing flange 32 separates a short distance 36 (running clearance) from a flange 34 mounted on hub 18.

Were it not for the present invention, dirty, unfiltered outside air would be free to enter the interior of cartridge 10 through the running clearance 36. This is so even despite the fact that filtered air is provided to the interior of cartridge 10 through air ports 24 and 26 because on rotation of the disk and hub combination a substantial centrifugal pumping action causes a partial vacuum to occur in the vicinity of the hub 18. If stop 20, 40 did not provide an airtight seal throughout the entire circumference of abutment, then the dirty outside air would be sucked through the stop and into the interior of the cartridge thereby potentially causing degradation of the disks by reason of the contaminents being ground against a disk surface by the flying heads.

In this regard, stop 20, 40 also comprises seals which effectively prevent any outside air from being sucked passed them and into the interior of cartridge 10.

Figure 2:
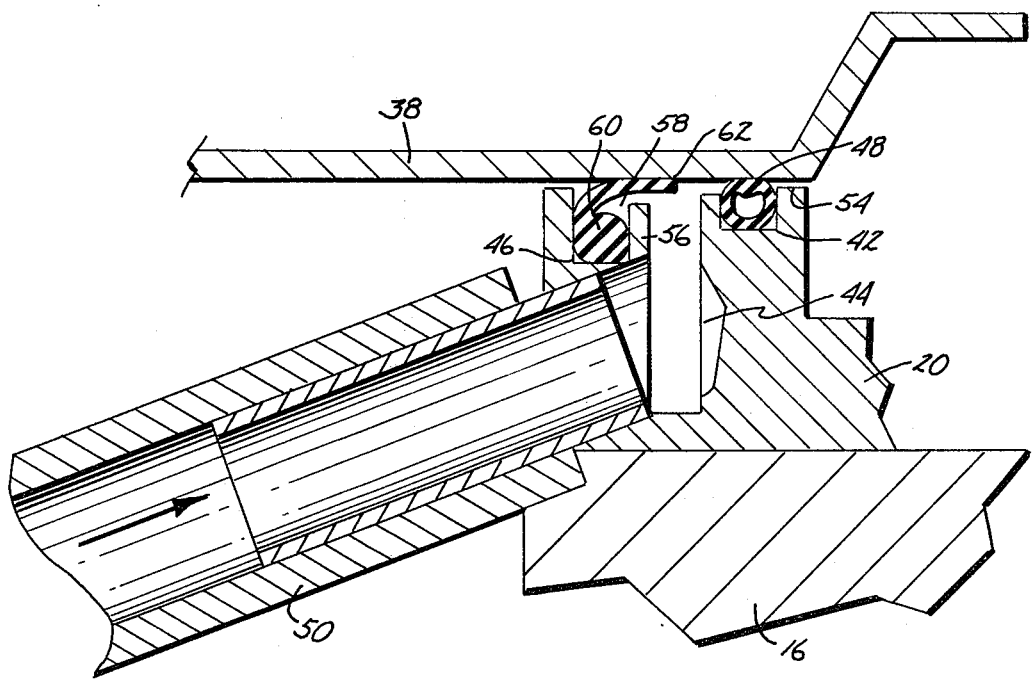
FIG. 2 is an isolated cross-sectional view of the stop seal of the present invention.

FIG. 2 is an isolated view of the left lateral cross-section 20 of stop 20, 40. The seals are essentially comprised of the following elements: an inner channel 42 in which is mounted a flexible hollow seal 48; an intermediate channel 44 connected at one point to a hose 50 or other means for connection to a source of pressurized filtered air (not shown) and an outer channel 46 in which is mounted a flexible flap seal 52.

In the arrangement shown in FIG. 2 the force of abutment of cartridge housing 38 against the flexible, hollow tube seal 48 is insufficient to press the cartridge housing 38 against the top 54 of the stop 20, 40. In the preferred embodiment the flexible, hollow tube seal is composed of a silicone rubber having the following characterstics: durometer 55, shore A. UL class 94 V-2 or better. The thickness of the tube wall is 0.015 inches and the outside diameter of cross-section is 0.095 inches. The tube seal has a 5.17 inches inside diameter.

Referring to the outer channel 46, its inner wall 56 is of a shorter dimension to allow pressurized filtered air from the intermediate channel 44 to enter the space 58 between the bulbous portion 60 of the seal 52 and the flap portion 62 of the seal. This forces the flap portion 62 of the seal to press against the bottom of the cartridge housing 38 and form an airtight seal about the entire circumference of the stop 20, 40. The purpose of the flap seal rather than a second tubular seal is to better accommodate severely warped cartridges. The flap 62 will follow the contours of a severely warped cartridge more readily than the tube seal 48.

The flap seal in the preferred embodiment is again composed of a silicon rubber of the following parameters: Durometer 55, shore A, UL Class 94V-2 or better (GE SE5559 or equivalent). The bulbous portion 62 in cross-section is approximately 0.075 inches by 0.100 inches and the flap portion 62 in cross-section is approximately 0.020 inches thick and 0.20 inches long. The inside diameter of the flap seal (measured to the bulbous portion 62) is approximately 5.650 inches.

It is to be noted that if there are any imperfections in the tube seal 48 or in the cartridge plastics 38, such as scratches, such as to allow air to enter into the interior of cartridge 10 the air will be drawn from the source of pressurized filtered air 50 and not from outside of the seal 20. The source of pressurized air of course is supplied through the disk drive's air filtration means (not shown).

This completes a description of the preferred embodiment. The enumeration of specific elements of the preferred embodiment are not to be taken as limitations on the scope of the appended claims.

What is claimed is:

1. A cartridge disk drive seal for preventing contaminated air from entering into the interior of a cartridge through the running clearance between the cartridge housing and hub when the cartridge is mounted on the disk drive's spindle, comprising:

an annular stop mounted on said disk drive's spindle housing and positioned for abutment against the bottom of said cartridge housing; said annular stop having mounted therein across its top three concentric channels opening toward said cartridge housing;

an annular flexible tube seal mounted in an inner one of said channels;

an intermediate one of said channels connected to connection means for connection to a source of pressurized air;

an annular flap seal means mounted in an outer one of said channels; the portion of said annular, stop separating said intermediate channel and said outer channel adapted to allow pressurized air from said intermediate channel enter said outer channel and force said flap seal into abutment with the bottom of said cartridge housing.

2. The seal of claim 1 wherein said tube seal is of such size and resiliency such as to prevent hard contact of said cartridge housing with said annular stop.

3. The seal of claim 1 wherein said tube seal is hollow.

4. The seal of claim 1 wherein said flap said is comprised of a bulbous portion and a flat portion; said bulbous portion dimension to fit snguly into said outer channel.

* * * * *